(12) United States Patent
Nejigaki et al.

(10) Patent No.: US 6,592,152 B1
(45) Date of Patent: Jul. 15, 2003

(54) JOINT STRUCTURE FOR FILTRATION MEMBRANE MODULE

(75) Inventors: Tatsuo Nejigaki, Fuji (JP); Nobuhiko Suga, Fuji (JP)

(73) Assignee: Asahi Kasei Corporation, Osaka (JP)

( * ) Notice: Subject to any disclaimer, the term of this patent is extended or adjusted under 35 U.S.C. 154(b) by 0 days.

(21) Appl. No.: 09/673,079

(22) PCT Filed: Apr. 27, 1999

(86) PCT No.: PCT/JP99/02250
§ 371 (c)(1),
(2), (4) Date: Oct. 10, 2000

(87) PCT Pub. No.: WO99/55447
PCT Pub. Date: Nov. 4, 1999

(30) Foreign Application Priority Data

Apr. 28, 1998 (JP) .......................... 10-118963

(51) Int. Cl.⁷ .................... F16L 55/00; B01D 61/20
(52) U.S. Cl. ................. 285/148.23; 285/342; 285/298
(58) Field of Search ............... 285/148.23, 342, 285/343, 298, 340; 210/195.1, 321.68, 232

(56) References Cited

U.S. PATENT DOCUMENTS

| | | | | |
|---|---|---|---|---|
| 616,578 A | * | 12/1898 | Love ........................... 285/343 |
| 1,809,582 A | * | 6/1931 | Church ....................... 285/154.1 |
| 2,100,796 A | * | 11/1937 | Church ........................ 126/314 |
| 2,302,617 A | * | 11/1942 | Little ....................... 137/247.27 |
| 2,461,828 A | * | 2/1949 | Lomelino ..................... 285/31 |
| 3,233,925 A | * | 2/1966 | Stevens ...................... 285/340 |
| 3,638,754 A | * | 2/1972 | Sosnowicz et al. ......... 181/211 |
| 4,025,093 A | * | 5/1977 | Leczcki ...................... 285/343 |
| 5,449,456 A | * | 9/1995 | Bowman ..................... 137/216 |
| 5,783,085 A | * | 7/1998 | Fischel .................. 210/321.68 |
| 5,817,235 A | * | 10/1998 | Tortosa ........................ 210/232 |
| 5,919,376 A | * | 7/1999 | Carman ..................... 210/195.1 |

FOREIGN PATENT DOCUMENTS

JP 60-21086 2/1985
JP 8-108050 4/1996

* cited by examiner

*Primary Examiner*—Eric K. Nicholson
(74) *Attorney, Agent, or Firm*—Dickstein, Shaprio, Morin & Oshinsky, LLP.

(57) ABSTRACT

The present invention relates to a joint structure between a filtration apparatus and a filtration membrane module, which is characterized in that a cap with a pipe is disposed on at least one end of a filtration membrane module using a cap nut capable of being screwed into a thread groove formed on the outer periphery of the end thereof, said pipe of the cap being inserted into and pressed against one end of a joint capable of controlling connection length at both ends, and a branch pipe of a header pipe of the filtration apparatus being inserted into and pressed against the other end of said joint.

According to the present invention, there can be obtained such a joint structure that requires fewer components for connection, has a simple construction at connections, and does not cause any leakage.

8 Claims, 7 Drawing Sheets

Fig. 7
*(Prior Art)*

JOINT STRUCTURE FOR FILTRATION MEMBRANE MODULE

TECHNICAL FIELD

The present invention relates to a joint structure of a filtration apparatus and a filtration membrane module. More particularly, it relates to a joint structure for coupling a filtration membrane module to header pipes of a filtration apparatus.

BACKGROUND ART

When a large amount of crude water such as river water, lake/marsh water, underground water, sea water, secondary treated water of effluent and industrial waste water is filtered to remove turbidity, a plurality of filtration membrane modules are employed. In order to make water treatment systems compact, filtration membrane modules are generally arranged in parallel and linked to a main pipe, a so-called header pipe, of the filtration apparatus. Particularly, in the case of a long cylindrical filtration membrane module having hollow fiber membranes mounted therein, a plurality of modules are vertically arranged in parallel between the upper and lower header pipes of the filtration apparatus for use. Therefore, an enormous amount of labor has been required to do the work at high elevation to couple the filtration membrane module with high precision to the upper header pipe of the filtration apparatus.

Figure 7:
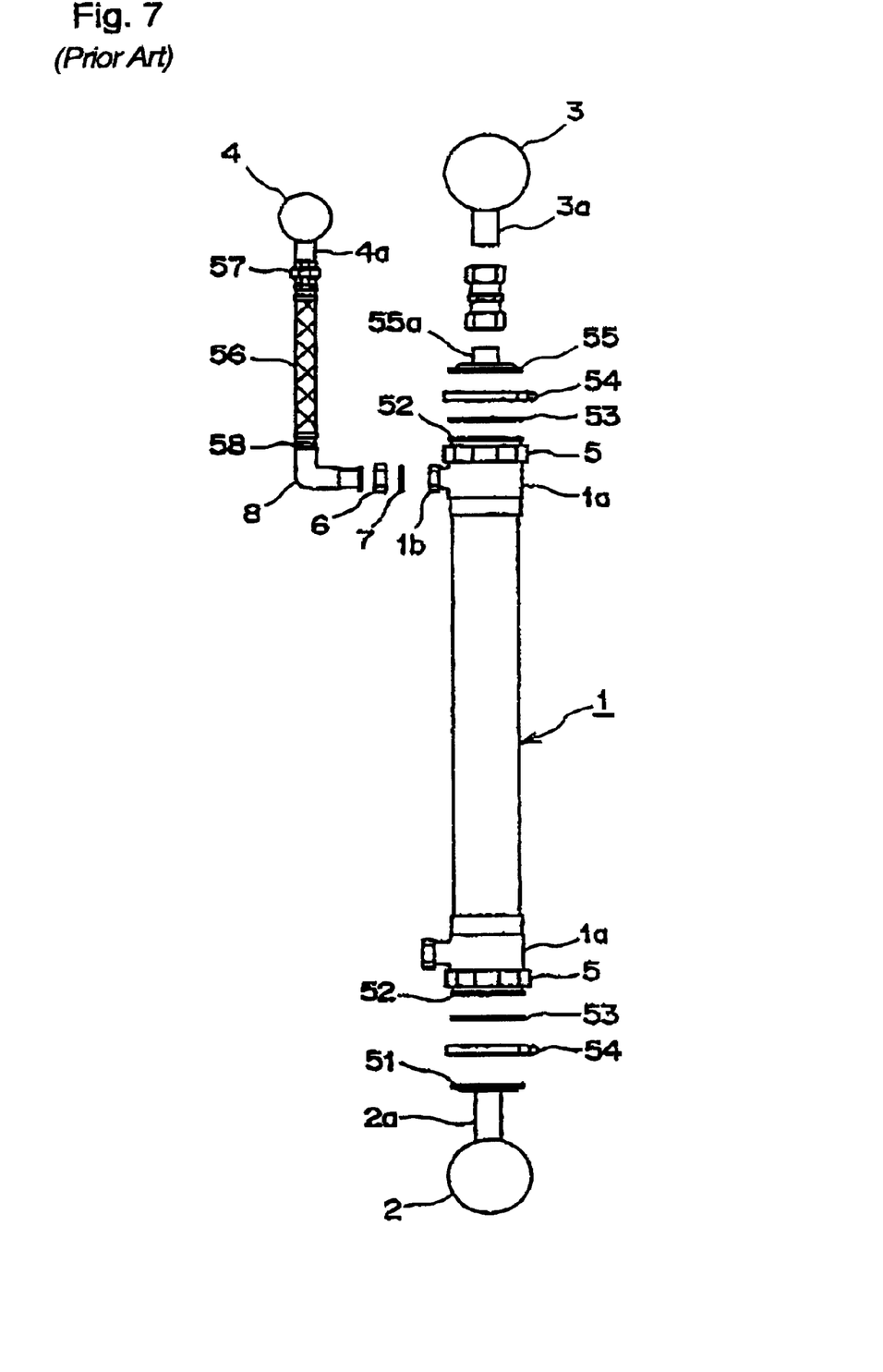
FIG. 7 is a fragmentary front view showing an example of conventional joint structures.

A conventional joint structure for filtration membrane modules is exemplified in FIG. 7. FIG. 7 is a fragmentary front view illustrating the joint structure of one of the plural modules which are arranged in parallel in a vertical position between upper and lower header pipes 2, 3 and 4 of the filtration apparatus. Three openings of the filtration membrane module 1 are individually coupled to a branch pipe 2a diverging from the lower header pipe 2 and branch pipes 3a and 4a diverging from the upper header pipes 3 and 4, respectively, interposing connection components therebetween which are individually described below.

The conventional typical filtration membrane module comprises a filtration membrane (not shown), a casing 1a which mounts and secures the filtration membrane, cap nuts 5 fastened to the both ends of the casing, and coupling flanges 52. Each of the coupling flanges 52 is secured by the cap nut 5 which is screwed into and fastened to a thread groove formed at the end periphery of the casing 1a.

The joint structure of the branch pipe 2a of the lower header pipe 2 and the lower opening of the filtration membrane module 1 in a vertical position is such that an O-ring 53 is interposed between a coupling flange 51 arranged at the upper end of the branch pipe 2a for supporting the weight of the filtration membrane module 1 and a coupling flange 52 secured at the end of the casing 1a of the filtration membrane module and said coupling flanges 51 and 52 are connected by a V-band clamp 54.

On the other hand, the joint structure of the branch pipe 3a of the upper header pipe 3 and the upper opening of the filtration membrane module 1 in a vertical position is such that the coupling flange 52 secured at the upper end of the casing 1a of the filtration membrane module and a coupling flange component 55 corresponding to said coupling flange 52 are connected by a V-band clamp 54 interposing an O-ring 53 therebetween, and further a pipe 55a arranged on the coupling flange component 55 and the branch pipe 3a diverging perpendicularly downward from the upper header pipe 3 are connected by a joint component.

Further, the joint structure of the branch pipe 4a of the header pipe 4 arranged approximately in parallel to the upper header pipe 3 of the filtration membrane module 1 and a third opening formed on the side of the upper end of said module 1 is such that the third opening is linked, interposing a flat packing 7, to an elbow 8, of which the other end is connected to a flexible tube 56 by a cap nut 6 screwed into and fastened to a thread groove formed at the end periphery of a conduit nozzle 1b arranged on the side of the end of the casing 1a, and further the elbow 8 is linked to a branch pipe 4a via a joint 57. The elbow 8 and the flexible tube 56 are linked by a cap nut 58 which is screwed into and fastened to a thread groove formed at the end periphery of the elbow 8.

Since such a conventional joint structure requires a large number of components for coupling the filtration membrane module 1 to each header pipe, difficulties have been encountered such that the work in assembling each of the connection components becomes troublesome, and in addition, the assembly work takes time. Further, in order to prevent liquid leakage at the connections of each component, high precision in assembly is required. Moreover, such a conventional system has the disadvantage of increased assembly labor and component costs.

DISCLOSURE OF THE INVENTION

The purpose of the present invention is to provide a joint structure which requires fewer components for connection, has a simple construction at connections, and does not cause any leakage. Also, the present invention provides a joint structure which requires reduced assembly labor, is set up by easy installation work, and is superior in installation reliability. Further, according to the present invention, a compact water treatment system can be constructed.

The present invention relates to a joint structure of a filtration apparatus and a filtration membrane module, wherein a cap with a pipe is coupled to at least one of the ends of the filtration membrane module by a cap nut capable of being screwed into a thread groove formed at the end periphery of the module, the pipe of the cap is inserted into and pressed against the one end of a joint capable of controlling connection length at the both ends, and a branch pipe of the header pipe of the filtration apparatus is inserted into and pressed against the other end of the joint.

BEST MODE FOR CARRYING OUT THE INVENTION

The joint structure of the filtration membrane module according to the present invention can be applied to a structure for coupling a filtration membrane module mounted with a hollow fiber filtration membrane in its casing to a main pipe, a so-called header pipe, in parallel array through branch pipes in a cross-flow type microfiltration apparatus or ultrafiltration apparatus wherein filtration is carried out while circulating a crude liquid such as river water, lake/marsh water, underground water, sea water, secondary treated water of effluent and industrial waste water. Further, it is also applicable to a structure for coupling a hollow fiber membrane module to a header pipe of a dead-end type filtration apparatus wherein crude water is not circulated.

Filtration methods using a hollow fiber membrane module include an external pressure filtration method wherein filtration is carried out in the direction from the outside of the hollow fiber membrane toward the inside thereof, and an internal pressure filtration method wherein filtration is carried out in the direction from the inside of the hollow fiber membrane toward the outside thereof. The joint structure of the filtration membrane module of the present invention is applicable to both the external and internal pressure filtration methods.

For example, in the case of driving a filtration apparatus according to the external pressure filtration method, a plurality of filtration membrane modules are generally installed at regular intervals so as to be in a vertical position between the main pipes (header pipes) of a filtrate discharge pipe and a crude water supply pipe, which are horizontally arranged at the top and the bottom of the filtration apparatus. In order to couple the modules, the upper header pipe is equipped with a plurality of branch pipes diverging perpendicularly downward, and the lower header pipe is equipped with a plurality of branch pipes diverging perpendicularly upward which are arranged at positions corresponding to those of the upper header pipe. Between these upper and lower branch pipes, filtration membrane modules are coupled.

To make the work of coupling a filtration membrane module to a header pipe easy and also to achieve secure connections, a filtration membrane module has been first improved in its shape, so as to be different from the conventional ones, in the present invention. The filtration membrane module used in the present invention is essentially composed of a filtration membrane and a module casing in which the filtration membrane is securely mounted, and does not have at the ends of the module such a coupling flange or a cap nut as does the above-described conventional filtration membrane module. The ends of the filtration membrane module used in the present invention have a simple appearance, i.e., only thread grooves are formed on the end peripheries of the casing.

The feature of the joint structure of the present invention employing the above filtration membrane module is that at least one end of the module is linked to a header pipe using, as joint components, a cap nut capable of being screwed into a thread groove formed at the end periphery of the module, a cap with a pipe, and a joint capable of controlling its connection length at both ends.

In the case where the filtration membrane module is coupled in a vertical position to the upper and lower header pipes, the joint structure for coupling the module to the upper header pipe is always as described above, i.e., such a structure that a cap with a pipe is secured at the upper end of the filtration membrane module by a cap nut capable of being screwed into a thread groove formed at the end periphery of the module, the pipe of the cap being inserted into and pressed against the end of a joint capable of controlling its connection length at the both ends, and the branch pipe of the upper header pipe of the filtration apparatus being inserted into and pressed against the other end of the joint.

The joint structures for coupling the module to the header pipe include several embodiments.

In one embodiment, the joint structures at the upper and lower portions are different. In this case, the lower portion can have the joint structures as follows:

A first embodiment is a structure characterized in that a flange disposed at the opening of the branch pipe of the lower header pipe and a lower end periphery of the filtration membrane module which is positioned so as to make its lower end face abut against the upper face of the flange are securely fastened with a cap nut which is inserted between the header pipe and the flange of the branch pipe and can be screwed into and fastened to a thread groove formed at the lower end periphery of the filtration membrane module case.

Another embodiment is a structure characterized in that the lower end of the filtration membrane module and a connection component abutting against the lower end face of the module are securely fastened with a cap nut capable of being screwed into and fastened to a thread groove formed at the lower end periphery of the filtration membrane module casing, and a flange disposed at the other end of the connection component and a flange disposed at the opening of the branch pipe of the lower header pipe, are bound with a band interposing a packing therebetween.

Further, another embodiment is a structure characterized in that the lower end of the filtration membrane module and a connection component abutting against the lower end face of the module are fastened with a cap nut capable of being screwed into and fastened to a thread groove formed at the lower end periphery of the filtration membrane module case, and a pipe constituting the other end of the connection component is linked to a branch pipe of the lower header pipe via a joint.

Yet another embodiment is a structure characterized in that the pipe of a cap with a pipe fixed to the lower end face of the filtration membrane module casing with a cap nut and the end of the branch pipe of the lower header pipe, are linked through a rubber ring, and its periphery is surrounded by a housing which is splittable into halves and clamped with bolts at the joint of the housing.

Then, there is the case where the joint structures between the filtration apparatus and the filtration membrane module are the same at the upper and lower portions. Namely, the structure for coupling the module to the upper header pipe is such that a cap with a pipe is disposed on the upper end face of the filtration membrane module with a cap nut capable of being screwed into and fastened to a thread groove formed at the end periphery of the module, the pipe of the cap being inserted into and pressed against one end of a joint, the connection length of which is adjustable, and the other end of the joint is inserted into and pressed against the branch pipe of the header pipe of the filtration apparatus. The structure for coupling the module to the lower header pipe is such that a cap with a pipe is disposed on the lower end face of the filtration membrane module, with a cap nut capable of being screwed into the thread groove formed at the end periphery of the module, the pipe of the cap being inserted into and pressed against one end of a joint, the connection length of which is adjustable, and the other end of the joint is inserted into and pressed against the branch pipe of the header pipe of the filtration apparatus.

Hereinafter, the embodiments of the joint structure of the filtration membrane module according to the present invention are illustrated in detail referring to drawings.

Figure 1:
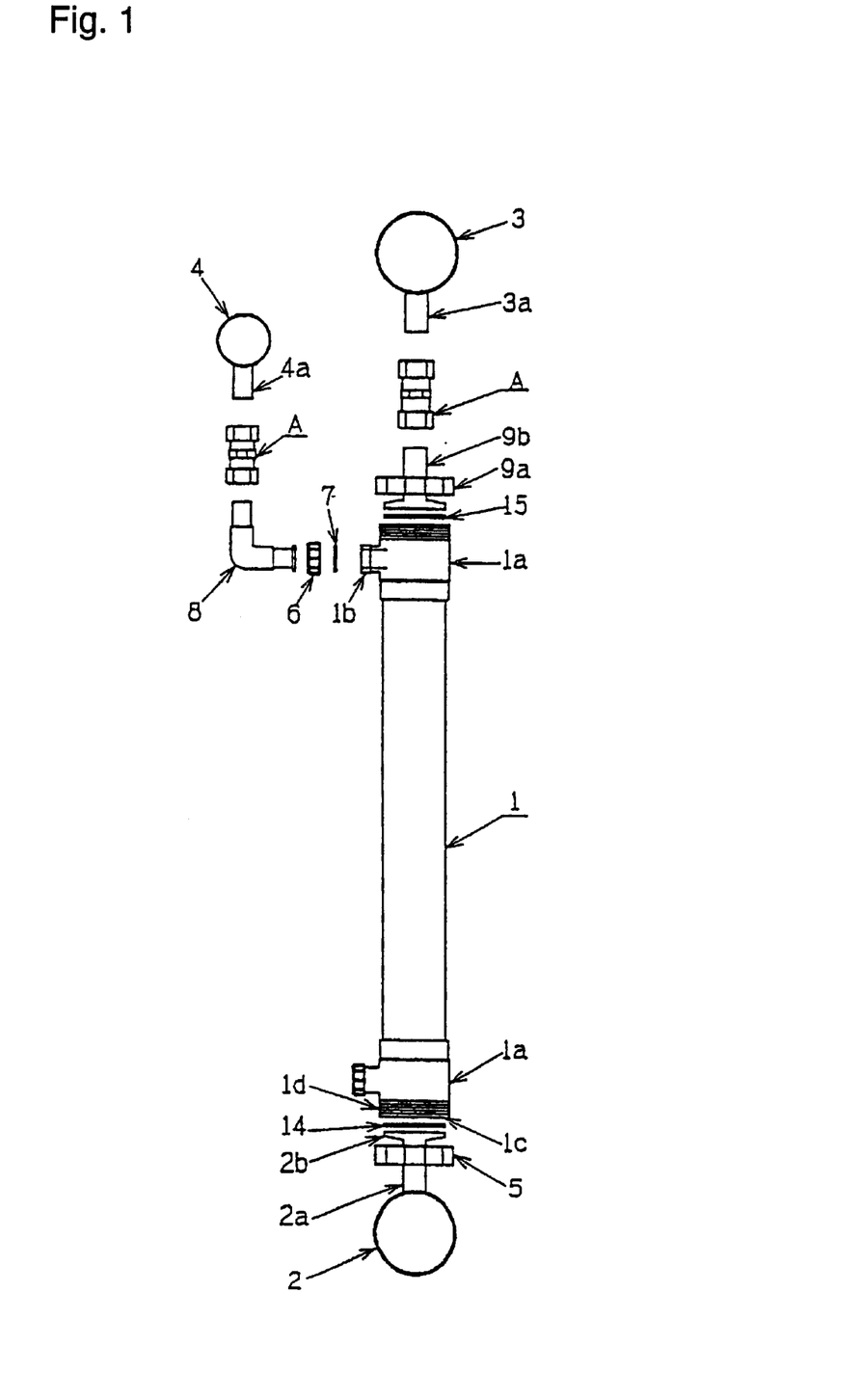
FIG. 1 is a fragmentary front view showing a first embodiment of the joint structure of the filtration membrane module according to the present invention.

FIG. 1 is a fragmentary front view of an embodiment of the joint structure of the present invention.

In FIG. 1, a filtration membrane module mounted with a hollow fiber membrane as a filtration membrane in a casing 1a is linked, by joint components described in detail below, to a branch pipe 2a for a crude liquid which diverges perpendicularly upward from a crude liquid inlet header pipe 2 for supplying the crude liquid and is disposed at the bottom of the filtration membrane module 1 in horizontal array. A branch pipe 3a for filtrate which diverges perpendicularly downward from a filtrate outlet header pipe 3 for discharging filtrate, is disposed at the top of the filtration membrane module 1 in horizontal array. A branch pipe 4a for returning the crude liquid which diverges perpendicularly downward from a crude liquid return header pipe 4, is disposed at the top of the filtration membrane module in horizontal array and approximately in parallel to the filtrate outlet header pipe 3, and the module is further linked to each of the header pipes 2, 3 and 4.

Referring to the embodiment shown in FIG. 1, the lower joint structure is first illustrated. The branch pipe 2a of the crude liquid inlet header pipe 2 is equipped with a flange 2b at its opening. And, over the periphery of the branch pipe 2a between the header pipe 2 and the flange 2b, a cap nut 5 which is freely moveable in the axial direction of the branch pipe is passed. As the cap nut 5, there is employed one that can be screwed into and fastened to a thread groove 1d formed at the lower end periphery of the casing 1a of the membrane module 1 to be coupled.

The connection part is structured so that the lower end face 1c of the filtration membrane module 1 is abutted against the flange 2b of the branch pipe 2a of the header pipe interposing a packing 14 such as an O-ring therebetween, and the flange 2b and the lower end of the module are securely fastened by the above-mentioned cap nut 5.

According to the above structure, not only is a simpler assembly configuration achieve, but also the filtration membrane module 1 can be more securely supported, compared to the conventional structures as shown in FIG. 7.

In the following, a joint structure for coupling the top of the filtration membrane module to the filtrate branch pipe 3a of the filtrate outlet header pipe 3 is illustrated. As connection components, there are employed a cap nut 9a which can be screwed into and fastened to a thread groove formed at the upper periphery of the casing 1a of the filtration membrane module 1, a cap 9 equipped with a pipe 9b, and a joint A capable of controlling its connection length at both ends.

The connection part is structured so that the cap 9 with a pipe is first abutted against the upper end face of the filtration membrane module 1 interposing a packing 15 such as an O-ring therebetween, and they are securely fastened by the cap nut 9a so that the pipe 9b protrudes therefrom. Then, the peripheries of the pipe 9b arranged on the cap 9 and that of a filtrate branch pipe 3a diverging perpendicularly downward from the filtrate outlet header pipe 3 are individually inserted into and pressed against a joint component A shown in FIG. 2.

Figure 2:
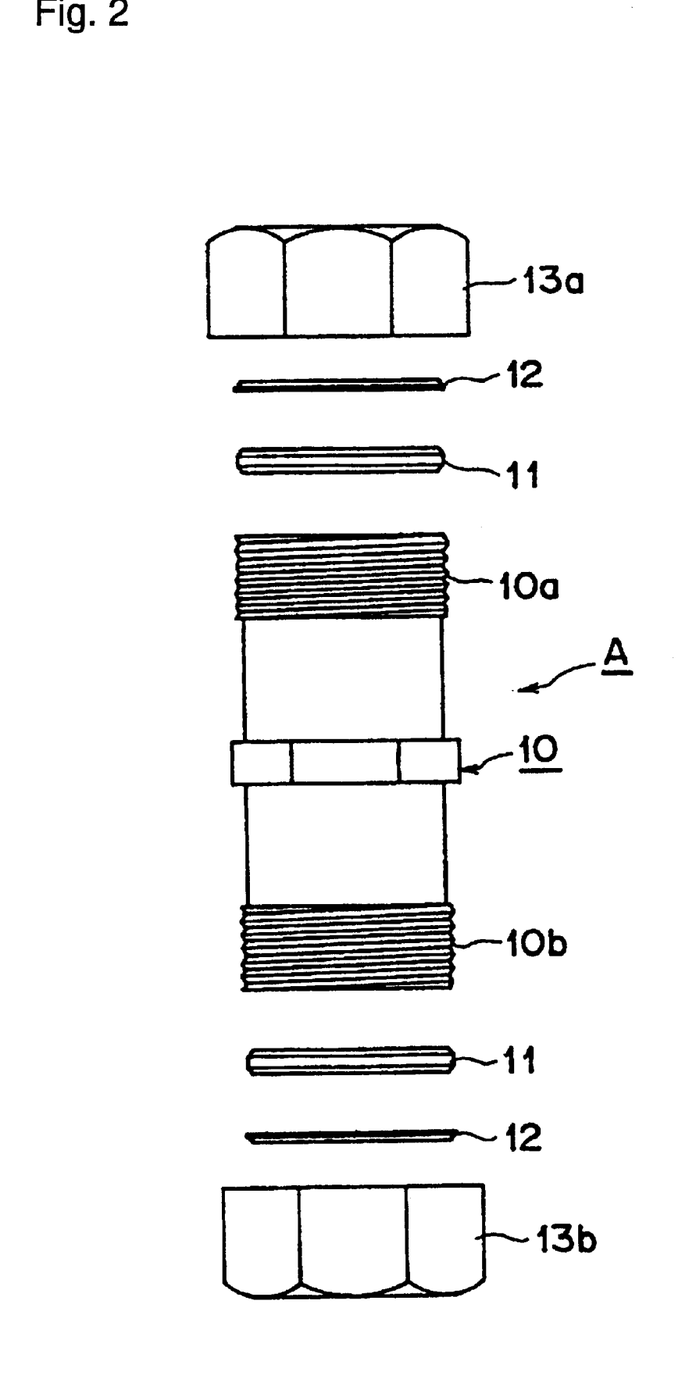
FIG. 2 is a fragmentary front view showing the construction of a joint component.

The joint component A is depicted in FIG. 2 as a cylindrical body 10 having thread grooves 10a and 10b at the both ends, and cap nuts 13a and 13b which can be screwed into and fastened to the thread grooves 10a and 10b interposing a packing 11 and a packing cover 12 therebetween.

For coupling the module to the header pipes using the joint component A, the filtrate branch pipe 3a and the pipe 9b are inserted individually into each end of the joint component A and united by screwing the cap nuts 13a and 13b lightly into the thread grooves 10a and 10b of the cylindrical body 10 interposing a packing 11 and a packing cover 12 therebetween in the assembly order as shown in FIG. 2. In this state, the positions of the top of the filtration membrane module and the filtrate branch pipe 3a of the filtrate outlet header pipe 3 are adjusted, and then the cap nuts 13a and 13b are screwed into and fastened to the thread groove 10a and 10b. At this time, the packing cover 12 presses the gasket 11 in the direction of the inner diameter so that the packing 11 is pressed against the outer peripheral surface of the filtrate branch pipe 3a and pipe 9b, achieving a secure assembly with good liquid-tightness.

According to the above structure, the work at the elevated place for coupling the upper end of the filtration membrane module 1 to the upper header pipe can be done easily. Further, the connection length can be easily controlled so that a firm connection can be achieved.

If a cap with a pipe can be formed at the end of the casing 1a of the filtration membrane module as one body according to a one-body molding, welding or the like, the pipe of the cap at the end of the filtration membrane module 1 and the filtrate branch pipe 3a diverging perpendicularly downward from the filtrate outlet header pipe 3 can be linked merely by connecting them to the above joint component A.

Next, an example of the connection between the crude liquid return header pipe 4, which is disposed almost in parallel to the filtrate outlet header pipe 3 above the filtration membrane module 1, and a third opening formed on the side of the upper end of the filtration membrane module 1, is illustrated. The end side surface of the casing 1a of the filtration membrane module 1 is equipped with a conduit nozzle 1b for returning non-filtered crude liquid to a crude liquid tank or a crude liquid line. This conduit nozzle 1b and the crude liquid return header pipe 4 are linked using a cap nut 6, an elbow 8, and a joint component A which is capable of controlling its connection length at the both ends.

The connection part is structured so that the conduit nozzle 1b disposed on the side of the end of the casing 1a and the elbow 8 are linked through a plane packing 7 by a cap nut 6 capable of being screwed into and fastened to a thread groove formed at the end periphery of the conduit nozzle 1b, and then the elbow 8 and the crude liquid return branch pipe 4a are linked via a joint component A. As the elbow 8, one whose vertical end part is shaped into a pipe capable of being inserted into and pressed against a joint component A, is used. The joint component A to be used has the same structure as described above.

The connection configuration between the above crude liquid return branch pipe 4a and the elbow 8 is not particularly limited to the above example. However, from the standpoint of ease and reliability of assembly, the above example is preferable.

In the filtration apparatus of FIG. 1, a crude liquid supplied from a crude liquid tank (not shown) using a pump, flows into the filtration membrane module 1 through the crude liquid inlet header pipe 2 and the crude liquid branch pipe 2a. And, the crude liquid is filtered through a hollow fiber membrane mounted in the module 1 in the direction from the outside to the inside, guided by the outlet header pipe 3, and stored in a filtrate tank, which is not shown in the figure.

On the other hand, a part of the crude liquid supplied from the crude liquid branch pipe 2a to the filtration membrane module 1 returns to the crude liquid tank (not shown) by running outside the hollow fiber membrane of the filtration membrane module 1 as a circulating return crude liquid, passing through the conduit nozzle 1b and the elbow 8, going through the crude liquid return branch pipe 4a and being guided by the crude liquid return header pipe 4.

Figure 3:
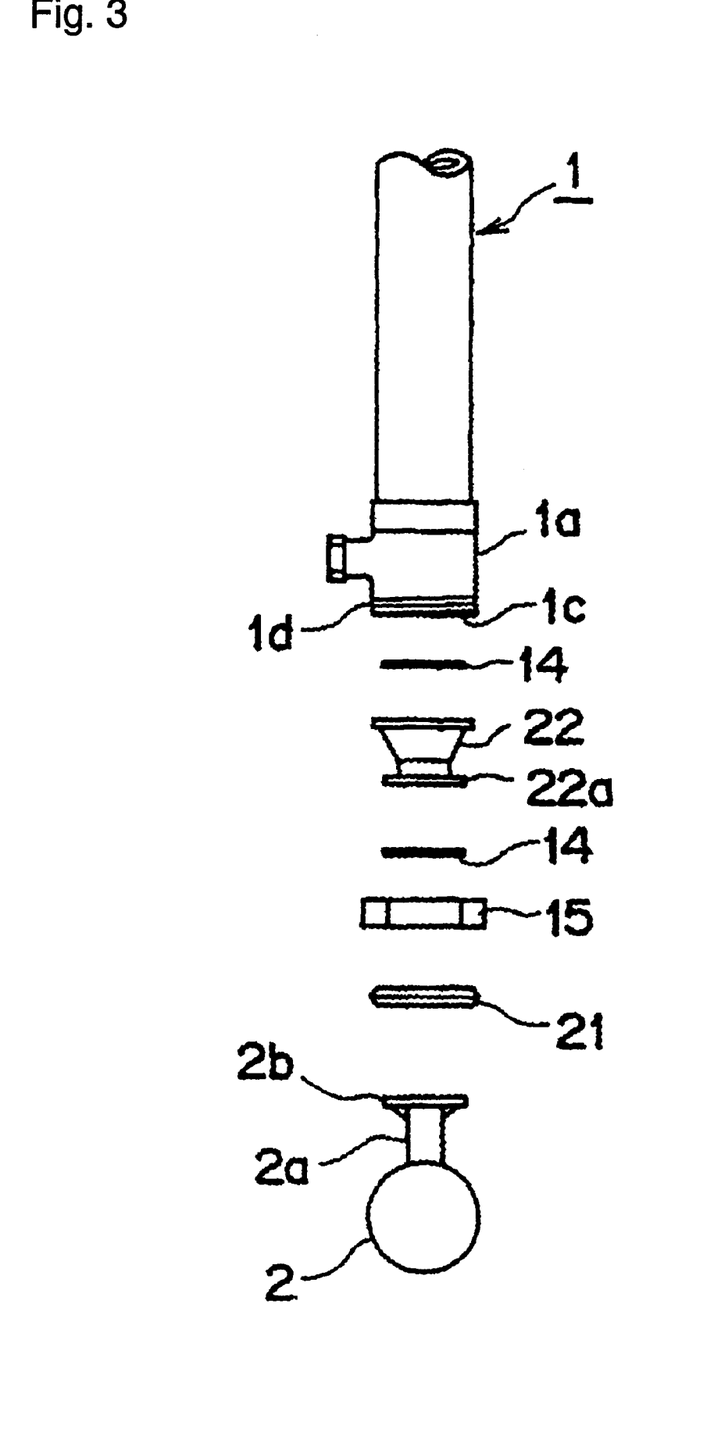
FIG. 3 is a fragmentary front view showing a second embodiment of the joint structure of the lower portion of the filtration membrane module according to the present invention.

Hereafter, a second embodiment of the joint structure of the filtration membrane module according to the present invention is illustrated referring to FIG. 3. FIG. 3 is a fragmentary front view of the lower portion of the standing filtration membrane module 1.

In FIG. 3, a branch pipe 2a diverging perpendicularly upward from the crude liquid inlet header pipe 2 has a flange 2b at the opening. On the other hand, the upper face of a connection component 22 equipped with a flange 22a at its lower end is abutted against the lower end face 1c of the filtration membrane module linked to the branch pipe interposing a packing 14 such as an O-ring therebetween, and they are fastened by a cap nut 15. As the cap nut 5, one capable of being screwed into and fastened to the thread groove 1d formed on the lower periphery or the module casing 1a is used.

And, the connection part is structured so that the flange 22a of the connection component 22 fixed to the lower end of the filtration membrane module 1 is abutted against the flange 2b of the crude liquid branch pipe 2a interposing a packing 14 such as an O-ring therebetween, and both flanges 22a and 2b are connected by a V-band clamp 21.

The upper joint structure of the filtration membrane module 1 is the same as the above first embodiment.

Figure 4:
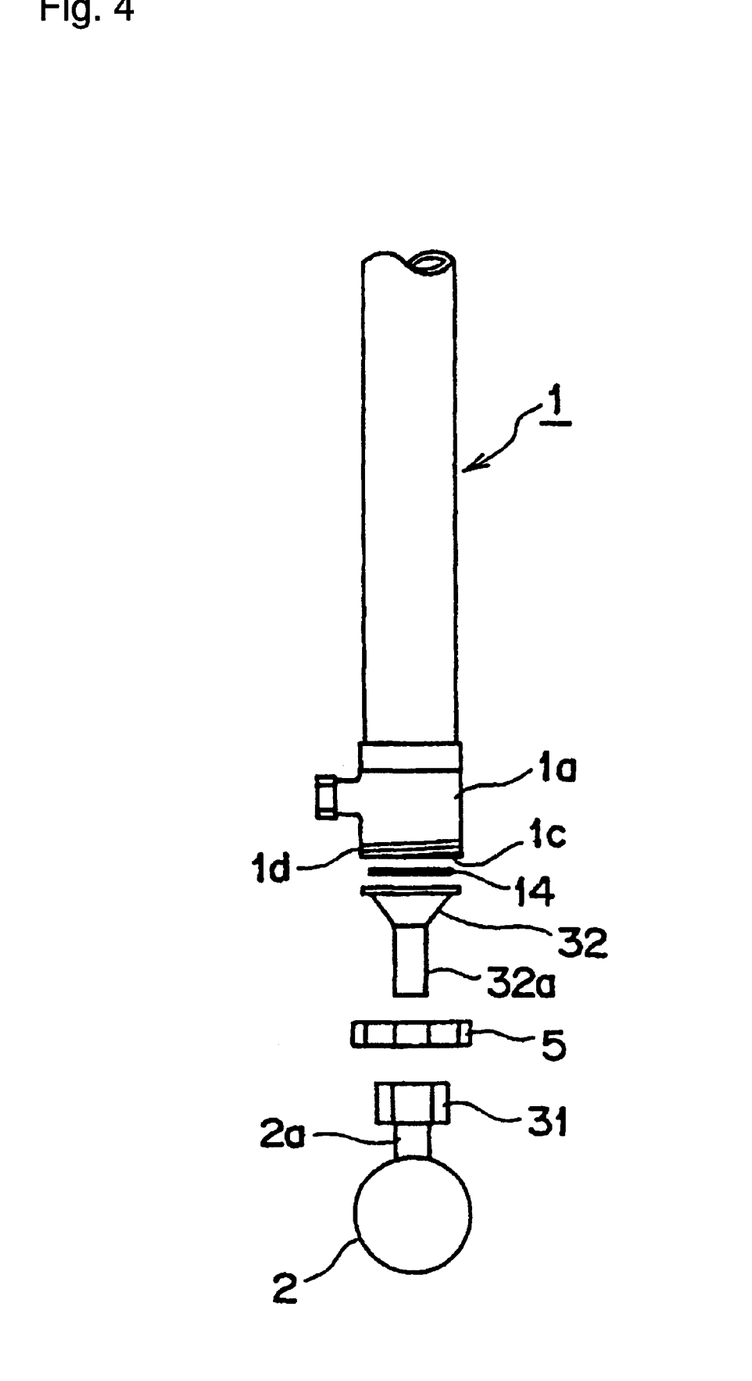
FIG. 4 is a fragmentary front view showing a third embodiment of the joint structure of the lower portion of the filtration membrane module according to the present invention.

Next, referring to FIG. 4, a third embodiment of the joint structure of the filtration membrane module according to the present invention is illustrated. FIG. 4 is a fragmentary front view of the lower joint structure of the standing filtration membrane module 1.

In FIG. 4, the branch pipe 2a diverging perpendicularly upward from the crude liquid inlet header pipe 2 is equipped with a joint component 31 at its opening. The joint component 31 has a packing 11, a packing cover 12 and a cap nut 13a which constitute the upper part of the joint component A shown in FIG. 2, and the crude liquid branch pipe 2a corresponds to the cylindrical body 10 of the joint component A described above.

On the other hand, the upper face of the connection component 32, of which lower end forms a pipe, is abutted against the lower face 1c of the filtration membrane module 1 linking to the branch pipe 2a interposing a packing 14, such as an O-ring therebetween, and they are fastened by a cap nut 5. As the cap nut 5, one capable of being screwed into and fastened to a thread groove 1d formed on the lower periphery of the module casing 1a, is used. Further, as the connection component 32, the one whose lower end is shaped in a pipe and can be inserted into the joint component 31 disposed at the end of a branch pipe, is employed.

The connection part is structured so that the pipe 32a of the connection component secured to the lower end of the filtration membrane module 1 by a cap nut 5 is inserted into and pressed against the joint component 31 arranged at the end of the branch pipe 2a.

The joint structure at the upper portion of the filtration membrane module 1 is the same as in the first embodiment described above.

Figure 5:
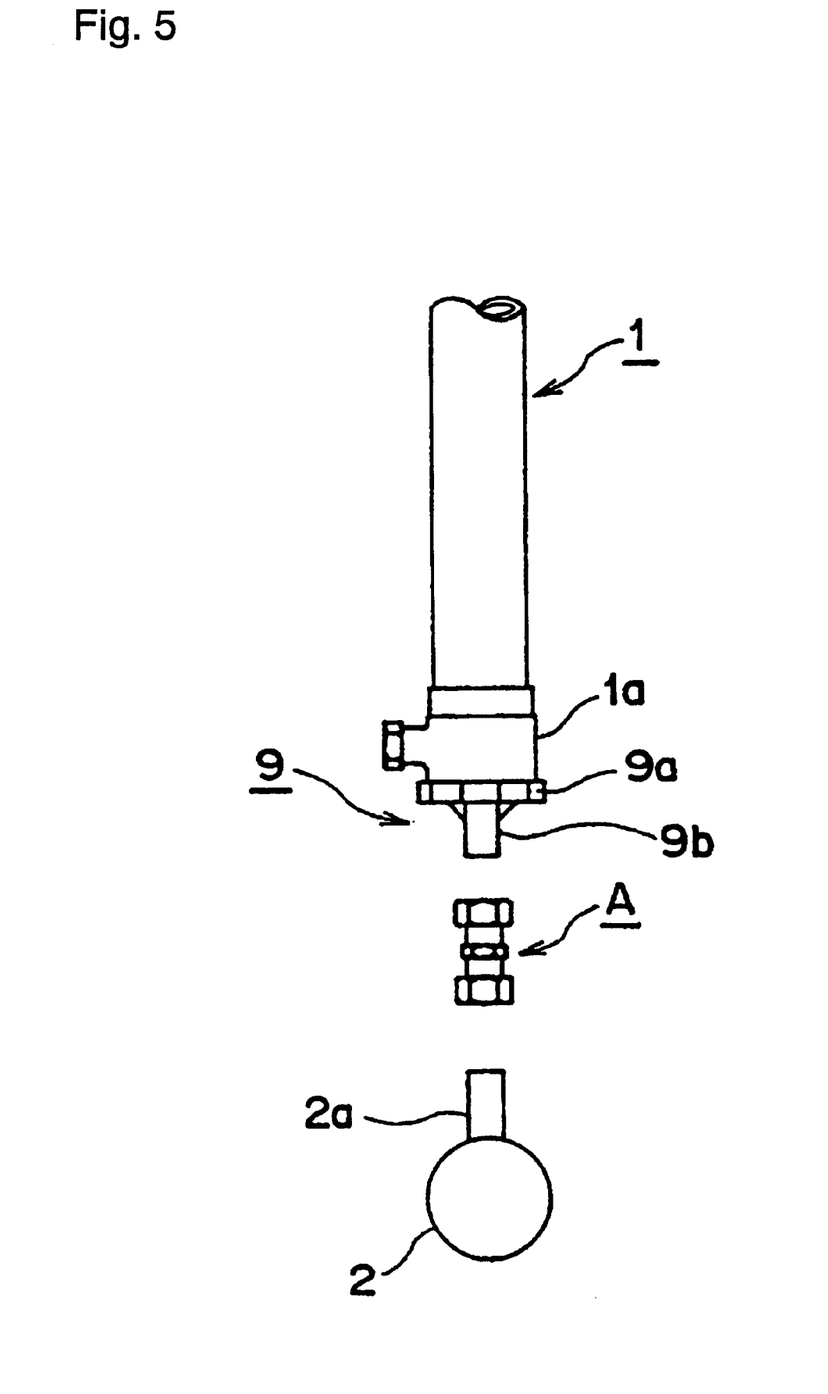
FIG. 5 is a fragmentary front view showing a fourth embodiment of the joint structure of the lower portion of the filtration membrane module according to the present invention.

Next, referring to FIG. 5, a fourth embodiment of the joint structure of the filtration membrane module according to the present invention. FIG. 5 is a fragmentary front view of the joint structure at the lower portion of the standing filtration membrane module 1.

The embodiment shown in FIG. 5 is the case wherein a structure for coupling the lower end of the filtration membrane module 1 to the crude liquid branch pipe 2a of the crude liquid inlet header pipe 2 is the same as that for coupling the upper end of the filtration membrane module 1 to the filtrate branch pipe 3a of the filtrate outlet header pipe 3 described in each embodiment.

Namely, as the connection component, a cap nut 9a, capable of being screwed into and fastened to a thread groove formed on the lower periphery of the casing 1a of the filtration membrane module 1, a cap 9 having a pipe 9b, and a joint A capable of controlling its connection length at both ends, are employed.

The connection part is structured so that the cap 9 with a pipe is abutted against the lower end face of the filtration membrane module 1 interposing a packing, such as an O-ring therebetween, and they are fastened by a cap nut 9a so as for the pipe 9b to protrude. Then, the pipe 9b disposed at the cap 9 and the periphery of the standing crude liquid branch pipe 2a diverging perpendicularly upward from the crude liquid header pipe 2 are individually inserted into and pressed against the joint component A shown in FIG. 2 to connect the lower end of the filtration membrane module 1 to the crude liquid branch pipe 2a.

Next, a fifth embodiment of the joint structure of the filtration membrane module according to the present invention is illustrated.

Figure 6:
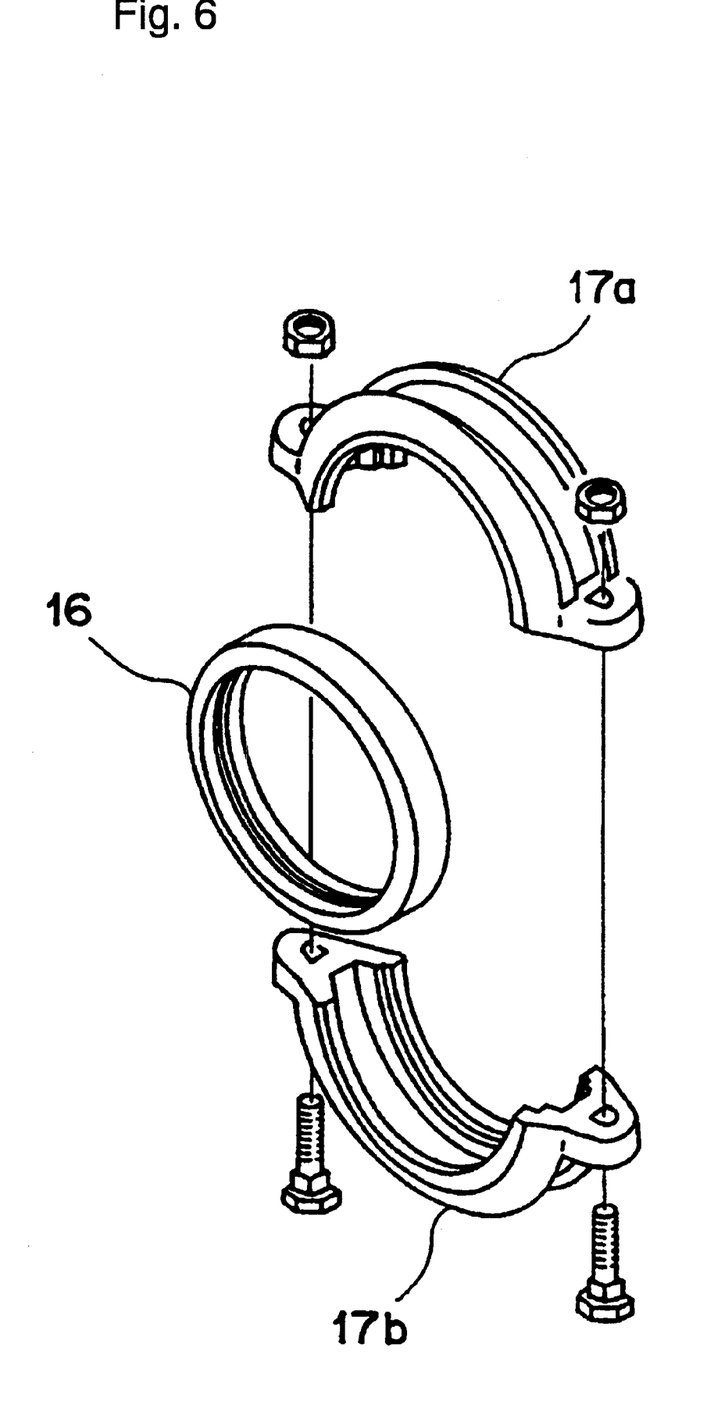
FIG. 6 is an oblique view showing the structure of another joint component.

FIG. 6 is an oblique view showing a joint component B used for coupling the lower end of the filtration membrane module to the end of the branch pipe of the lower header pipe.

The joint component B is composed, as shown in FIG. 6, of a rubber ring 16, and a housing splittable into halves 17a and 17b. On the inner circumference of the housings 17a and 17b, there is formed a groove having the same size as that of the outer circumference of the rubber ring and, on the outer circumference of the parting face of each housing, joints which can be clamped with bolts, are disposed.

To link the lower end of the filtration membrane module to the branch pipe 2a of the lower header pipe using a joint component B, a pipe is first arranged on the lower end face of the filtration membrane module. The method for arranging the pipe on the end face of the module may include either the method as described in the first embodiment wherein the cap 9 with a pipe is secured using the cap nut 9a or the method as described in the third embodiment wherein the connection component 32 having a pipe is secured using the cap nut 5.

Then, the pipe secured on the end face of the filtration membrane module and the branch pipe of the header pipe are inserted into the rubber ring of the joint component B so as to butt against each other, and then the circumference of the rubber ring is fitted into the groove of the housing to secure the two housings by clamping with bolts.

Accordingly, the joint part is structured so that the pipe secured on the lower end face of the filtration membrane module and the branch pipe of the header pipe are linked through a rubber ring and their outer circumferences are surrounded by a housing splittable into halves and secured by clamping the joint part of the housing with bolts.

The joint structure of the upper part of the filtration membrane module 1 is the same as the above first embodiment described above.

In the joint structures of the present invention illustrated above, when the filtration membrane module is coupled to the branch pipe of the header pipe using the cap 9 with a pipe or the connection component 32 with a pipe as a connection component and the joint component A or B, it is more preferable that the outer diameters of the pipes to be connected each other are equal.

As described above, the joint structure of the present invention is suitable for the case of a longitudinally mounted hollow fiber membrane module in a vertical position. According to the joint structure of the present invention, even in the case of mounting a plurality of large-scale hollow fiber membrane modules having a length of 1 meter or longer in a vertical position, a good workability and highly reliable connections can be achieved.

The packing used in the present invention can be an O-ring, a gasket, and the like. A band is suitably chosen according to the packing to be used. The band includes a V-band clamp, a clamp band, and the like.

The materials of the module casing or the connection component to be used in the present invention are not particularly limited, but there are used, for example, a polysulfone resin, a polyvinyl chloride resin, a polyphenyl ether resin, a acrylonitrile-butadiene-styrene copolymer resin, an acrylonitrile-styrene copolymer resin, a polyphenylene sulfide resin, a polyamide resin, a polymethyl methacrylate resin, a polycarbonate resin, a polyether ether ketone resin, polyvinylidene fluoride resin, a polyethylene resin, a polypropylene resin, etc., and resins filled with a glass fiber or carbon fiber to improve strength of the above-listed resins, metal materials such as stainless steel, cast iron and aluminum, and ceramics such as glass and alumina.

The joint A shown in FIG. 1 preferably has a cylindrical body made of a transparent material since leakage of the module can be found in a state where the filtration membrane module is installed in the filtration apparatus. As the transparent material, there are used a polysulfone resin, a polymethyl methacrylate resin, a polycarbonate resin, a polyvinyl chloride resin, a glass and the like.

INDUSTRIAL APPLICABILITY

According to the present invention, there can be obtained such a joint structure that requires a fewer numbers of components for connection, has a simple composition at connections, and does not cause any leakage. And also, there can be obtained a joint structure which requires reduced installation labor, is set up by easy installation work, and is superior in installation reliability.

Further, according to the present invention, a compact water treatment system can be constructed.

What is claimed is:

1. A joint structure between a filtration apparatus and a filtration membrane module, which is characterized in that a cap with a pipe is disposed on at least one end of a filtration membrane module using a cap nut capable of being screwed into a thread groove formed at the outer end periphery of the module, said pipe of the cap being inserted into and pressed against one end of a joint capable of controlling connection length at both ends, and a branch pipe of a header pipe of the filtration apparatus being inserted into and pressed against the other end of said joint.

2. A joint structure between a filtration apparatus and a filtration membrane module, which is characterized in that said filtration apparatus is equipped with the filtration membrane module in a vertical position between the header pipes arranged in horizontal array at the top and the bottom of the module, a cap with a pipe being disposed on the upper end face of said filtration membrane module using a cap nut capable of being screwed into a thread groove formed at the outer end periphery of the module, said pipe of the cap being inserted into and pressed against one end of a joint capable of controlling connection length at both ends, and a branch pipe of a header pipe of the filtration apparatus being inserted into and pressed against the other end of said joint.

3. The joint structure of the filtration membrane module according to claim 2, wherein a flange disposed at an opening of a branch pipe of a lower header pipe and a lower end periphery of the filtration membrane module positioned so as to make its lower end face abut against the upper face of the flange, are securely fastened with a cap nut which is inserted between the header pipe and the flange of the branch pipe and can be screwed into and fastened to a thread groove formed at the lower end periphery of the filtration membrane module case.

4. The joint structure of the filtration membrane module according to claim 2, wherein the lower end of the filtration membrane module and a connection component abutting against the lower end face of the module are securely fastened with a cap nut capable of being screwed into and fastened to a thread groove formed at the lower end periphery of the filtration membrane module casing, and a flange disposed at the other end of the connection component and a flange disposed at the opening of the branch pipe of the lower header pipe are bound with a band interposing a packing therebetween.

5. The joint structure of the filtration membrane module according to claim 2, wherein the lower end of the filtration membrane module and a connection component abutting against the lower end face of the module are fastened with a cap nut capable of being screwed into and fastened to a thread groove formed at the lower end periphery of the filtration membrane module case, and a pipe constituting the other end of the connection component is linked to a branch pipe of the lower header pipe via a joint.

6. The joint structure of the filtration membrane module according to claim 2, wherein the pipe of a cap with a pipe fixed to the lower end face of the filtration membrane module casing with a cap nut and the end of the branch pipe of the lower header pipe are linked through a rubber ring, whose periphery is surrounded by a housing splittable into halves and clamped with bolts at the joint of the housing.

7. The joint structure of the filtration membrane module according to claim 2, wherein the joint structures are identical at the upper and lower portion of the filtration membrane module in a vertical position.

8. The joint structure of the filtration membrane module according to claim 1, wherein the filtration membrane module is essentially composed of a filtration membrane, and a module casing which mounts a filtration membrane securely.

\* \* \* \* \*